(12) United States Patent
Jung et al.

(10) Patent No.: US 9,477,125 B2
(45) Date of Patent: Oct. 25, 2016

(54) LIQUID CRYSTAL DISPLAY DEVICE

(71) Applicant: SAMSUNG DISPLAY CO., LTD., Yongin, Gyeonggi-Do (KR)

(72) Inventors: Kwang Chul Jung, Seongnam-si (KR); Sun Hwa Lee, Hwaseong-si (KR); Mee Hye Jung, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 14/321,614

(22) Filed: Jul. 1, 2014

(65) Prior Publication Data
US 2015/0241743 A1   Aug. 27, 2015

(30) Foreign Application Priority Data
Feb. 21, 2014   (KR) .................. 10-2014-0020516

(51) Int. Cl.
| | |
|---|---|
| *G02F 1/136* | (2006.01) |
| *G02F 1/1362* | (2006.01) |
| *G09G 3/36* | (2006.01) |
| *G02F 1/1343* | (2006.01) |

(52) U.S. Cl.
CPC ....... *G02F 1/136286* (2013.01); *G09G 3/3607* (2013.01); *G02F 2001/134345* (2013.01); *G09G 2300/0426* (2013.01); *G09G 2300/0465* (2013.01); *G09G 2300/0842* (2013.01); *G09G 2300/0876* (2013.01)

(58) Field of Classification Search
USPC ......................................................... 349/43
See application file for complete search history.

(56) References Cited

U.S. PATENT DOCUMENTS

| | | | | |
|---|---|---|---|---|
| 7,433,010 B2* | 10/2008 | Lim | ..................... | G02F 1/1339 349/110 |
| 2005/0139837 A1* | 6/2005 | Lee | ................... | G02F 1/134363 257/72 |
| 2010/0265447 A1* | 10/2010 | Seo | ................... | G02F 1/134363 349/141 |
| 2012/0062448 A1* | 3/2012 | Kim | ................. | G02F 1/133377 345/55 |

(Continued)

FOREIGN PATENT DOCUMENTS

| | | |
|---|---|---|
| KR | 10-2006-0062908 A | 6/2006 |
| KR | 10-2011-0075468 A | 7/2011 |

(Continued)

OTHER PUBLICATIONS

Korean Patent Abstract No. 10-20080051916A for corresponding Korean Application No. 10-1351373 B1.
Korean Patent Abstract No. 10-20070034145A for corresponding Korean Application No. 10-1182771 B1.

*Primary Examiner* — Lucy Chien
(74) *Attorney, Agent, or Firm* — Lewis Roca Rothgerber Christie LLP

(57) ABSTRACT

A liquid crystal display includes a substrate including a plurality of pixels, each pixel having a first sub-pixel and a second sub-pixel; a pixel electrode including a first pixel electrode formed in a region corresponding to the first sub-pixel and a second pixel electrode formed in a region corresponding to the second sub-pixel on the substrate; a common electrode including a first common electrode formed to be spaced from the first pixel electrode and a second common electrode formed to be spaced from the second pixel electrode on the substrate; and a thin film transistor formed on the substrate to be electrically connected to the first pixel electrode and the second pixel electrode.

20 Claims, 9 Drawing Sheets

(56) References Cited

U.S. PATENT DOCUMENTS

| | | | |
|---|---|---|---|
| 2013/0038808 A1* | 2/2013 | Song | G02F 1/133707 349/43 |
| 2013/0063686 A1* | 3/2013 | Tashiro | G02F 1/133707 349/98 |
| 2013/0088418 A1* | 4/2013 | Kim | H04N 13/0434 345/92 |
| 2014/0028937 A1* | 1/2014 | Uchida | G09G 3/3655 349/41 |

FOREIGN PATENT DOCUMENTS

| | | |
|---|---|---|
| KR | 10-1182771 B1 | 9/2012 |
| KR | 10-2013-0019570 | 2/2013 |
| KR | 10-1351373 B1 | 1/2014 |

\* cited by examiner

<POLARITY OF PIXEL VOLTAGE Vp>   <ARRANGEMENT OF FIRST COMMON ELECTRODES CE1 AND SECOND COMMON ELECTRODES CE2>

LIQUID CRYSTAL DISPLAY DEVICE

CROSS-REFERENCE TO RELATED APPLICATION

This application claims priority to and the benefit of Korean Patent Application No. 10-2014-0020516, filed on Feb. 21, 2014 in the Korean Intellectual Property Office, the content of which is incorporated herein by reference in its entirety.

BACKGROUND

1. Field

The following description relates to a liquid crystal display device.

2. Description of the Related Art

A liquid crystal display, which is one of the display devices that have been widely used (utilized), is a display device that can adjust the quantity of penetrating light by applying a voltage to two opposite electrodes (a pixel electrode and a common electrode) and thereby controlling an arrangement of liquid crystal molecules of a liquid crystal layer interposed between the two electrodes.

Typically, the liquid crystal display device is configured to maintain a distance between two substrates such that a liquid crystal layer is provided between the two substrates. For this configuration, a spacer is formed between the two substrates. However, since the spacer is bonded to one of the two substrates through an adhesive, a manufacturing process of the liquid crystal display device may be complicated, and the cost may be increased.

SUMMARY

In order to simplify a manufacturing process of the liquid crystal display device and reduce the cost, a liquid crystal display device including a cavity on one substrate to provide a space for forming a liquid crystal layer, instead of a spacer between two substrates, has been developed.

In order to improve the visibility, the liquid crystal display device has been developed such that one pixel is divided into two sub-pixels, and a voltage of high level and a voltage of low level are applied to the two sub-pixels, respectively, to differ the alignment direction of liquid crystal molecules in one pixel. To that end, the liquid crystal display device includes a plurality of thin film transistors or the like, and the structure including a plurality of thin film transistors or the like narrows an opening area through which light is transmitted. Thus, there may be a limit to an increase in aperture ratio of the liquid crystal display device.

Aspects of the present inventive concept are directed toward a liquid crystal display device capable of increasing an aperture ratio while improving the visibility, and also reducing or minimizing the loss of transmittance.

However, aspects of the present invention are not restricted to the one set forth herein. The above and other aspects of the present invention will become more apparent to one of ordinary skill in the art to which the present invention pertains by referencing the detailed description of embodiments of the present invention given below.

In one embodiment of the present invention, a liquid crystal display device includes: a substrate including a plurality of pixels, each pixel having a first sub-pixel and a second sub-pixel; a pixel electrode on the substrate and including a first pixel electrode in a region corresponding to the first sub-pixel and a second pixel electrode in a region corresponding to the second sub-pixel; a common electrode on the substrate and including a first common electrode spaced (spaced apart) from the first pixel electrode and a second common electrode spaced from the second pixel electrode; and a thin film transistor on the substrate and electrically connected to the first pixel electrode and the second pixel electrode.

A same data voltage may be applied to the first pixel electrode and the second pixel electrode, wherein a first common voltage is applied to the first common electrode, and wherein a second common voltage different from the first common voltage is applied to the second common electrode.

Each of the first common voltage and the second common voltage may have a swing of 1V in irregular units of frames.

The first pixel electrode and the second pixel electrode may have an area ratio of 1:1.

The liquid crystal display device may further include: a plurality of gate lines on the substrate, extending in a first direction and spaced from each other in a second direction intersecting (crossing) the first direction; a plurality of common lines on the substrate and in parallel to the gate lines; and a plurality of data lines on the substrate, spaced from the gate lines, extending in the second direction, and spaced from each other in the first direction, wherein among the plurality of common lines, odd-numbered common lines are electrically connected to the first common electrode, and even-numbered common lines are electrically connected to the second common electrode.

The first sub-pixel may be above a first gate line of the plurality of gate lines in the second direction, and the second sub-pixel may be below the first gate line in the second direction.

A second gate line of the plurality of gate lines may be at a next stage of the first gate line (next to and at a set distance away from the first gate line), a first sub-pixel is above the second gate line (in a plane view of the liquid crystal display device), and a second sub-pixel is below the second gate line, and wherein the first common electrode or the second common electrode is a single (one piece) electrode on a second pixel electrode of the second sub-pixel below the first gate line and a first pixel electrode of the first sub-pixel above the second gate line.

Each of the first common electrode and the second common electrode may have a structure horizontally extending in the first direction.

The thin film transistor may include a gate electrode connected to each of the gate lines, a source electrode connected to each of the data lines, and a drain electrode connected to the first pixel electrode and the second pixel electrode, and wherein the liquid crystal display device may further include: a first contact hole to electrically connect the first pixel electrode and the second pixel electrode to the drain electrode; a second contact hole to electrically connect the first common electrode to the odd-numbered common lines; a third contact hole to electrically connect the second common electrode to the even-numbered common lines; and a liquid crystal layer between the first pixel electrode and the first common electrode, and between the second pixel electrode and the second common electrode.

In another embodiment of the present invention, a liquid crystal display device includes: a substrate including a plurality of pixels, each pixel having a first sub-pixel and a second sub-pixel; a plurality of gate lines on the substrate extending in a first direction and spaced from each other in a second direction intersecting (crossing) the first direction, and a plurality of common lines on the substrate in parallel to the gate lines; a gate insulating layer on the substrate to cover the gate lines and the common lines; a plurality of data lines on the gate insulating layer extending in the second direction and spaced from each other in the first direction; and an insulating layer on the gate insulating layer to cover the data lines; a pixel electrode including a first pixel electrode in a region corresponding to the first sub-pixel and a second pixel electrode in a region corresponding to the second sub-pixel on the insulating layer; a common electrode on the insulating layer and spaced from the pixel electrode, a cavity between the common electrode and the pixel electrode, the common electrode including a first common electrode extending in the first direction to overlap with the first pixel electrode and a second common electrode extending in the first direction to overlap with the second pixel electrode; and a thin film transistor on the substrate and electrically connected to the first pixel electrode and the second pixel electrode.

A same data voltage may be applied to the first pixel electrode and the second pixel electrode, wherein a first common voltage is applied to the first common electrode, and wherein a second common voltage different from the first common voltage is applied to the second common electrode.

Each of the first common voltage and the second common voltage may have a swing (a change in voltage) of 1V in irregular units of frames.

The first pixel electrode and the second pixel electrode may have an area ratio of 1:1.

The first sub-pixel may be above a first gate line of the plurality of gate lines in the second direction, and the second sub-pixel may be below the first gate line in the second direction.

A second gate line of the plurality of gate lines may be at a next stage of the first gate line, a first sub-pixel is above the second gate line, and a second sub-pixel is below the second gate line, and wherein the first common electrode or the second common electrode is a single electrode on a second pixel electrode of the second sub-pixel below the first gate line and a first pixel electrode of the first sub-pixel above the second gate line.

The liquid crystal display device may further include: a first protective layer between the insulating layer and the pixel electrode; a second protective layer on the common electrode; a covering layer on the first protective layer to include sidewalls to separate the plurality of pixels from each other in the first direction, and a roof above the sidewalls; a liquid crystal layer including liquid crystal molecules injected into the cavity (liquid crystal materials in the cavity); and a capping layer on the covering layer.

The covering layer may include a liquid crystal inlet in the first direction to overlap with the gate lines, and wherein the liquid crystal display device further includes a sealing film to seal the liquid crystal inlet.

The thin film transistor may include a gate electrode connected to each of the gate lines, a source electrode connected to each of the data lines, and a drain electrode connected to the first pixel electrode and the second pixel electrode.

The liquid crystal display device may further include: a first contact hole to expose the drain electrode through the first protective layer and the insulating layer; a second contact hole to expose a first protrusion on a first common line through the first protective layer, the insulating layer and the gate insulating layer; and a third contact hole to expose a second protrusion on a second common line through the first protective layer, the insulating layer and the gate insulating layer, wherein the first pixel electrode and the second pixel electrode are electrically connected to the drain electrode through the first contact hole, the first common electrode is electrically connected to the first common line through the second contact hole, and the second common electrode is electrically connected to the second common line through the third contact hole.

The first protrusion may be between first sub-pixels in the first direction, and the second protrusion may be between second sub-pixels in the first direction.

According to the embodiments of the present invention, at least the following effects can be obtained.

In the liquid crystal display device according to one embodiment of the present invention, by forming in one pixel and on one substrate a thin film transistor, a first pixel electrode and a second pixel electrode to which the same pixel voltage is applied, and a first common electrode and a second common electrode to which different common voltages are applied, it is possible to increase an aperture ratio while improving the visibility with a simple structure.

Further, in the liquid crystal display device according to one embodiment of the present invention, by controlling in one pixel a difference between a first voltage applied to a first sub-pixel and a second voltage applied to a second sub-pixel to about 1V or less, display quality can be improved by minimizing (reducing) the loss of transmittance, for example, the loss of transmittance at a high gray level.

The effects of the present invention are not limited to the above-described effects and other effects which are not described herein will become apparent to those skilled in the art from the following description.

BRIEF DESCRIPTION OF THE DRAWINGS

The above and other aspects and features of the present inventive concept will become more apparent by describing in more detail example embodiments thereof with reference to the attached drawings, in which:

FIG. 10 is a diagram showing the arrangement of voltages applied to the sub-pixels of FIG. 1;

FIG. 11 is a diagram showing the polarity of the pixel voltage applied to the sub-pixels and the arrangement of the common electrodes of FIG. 1;

DETAILED DESCRIPTION

Figure 1:
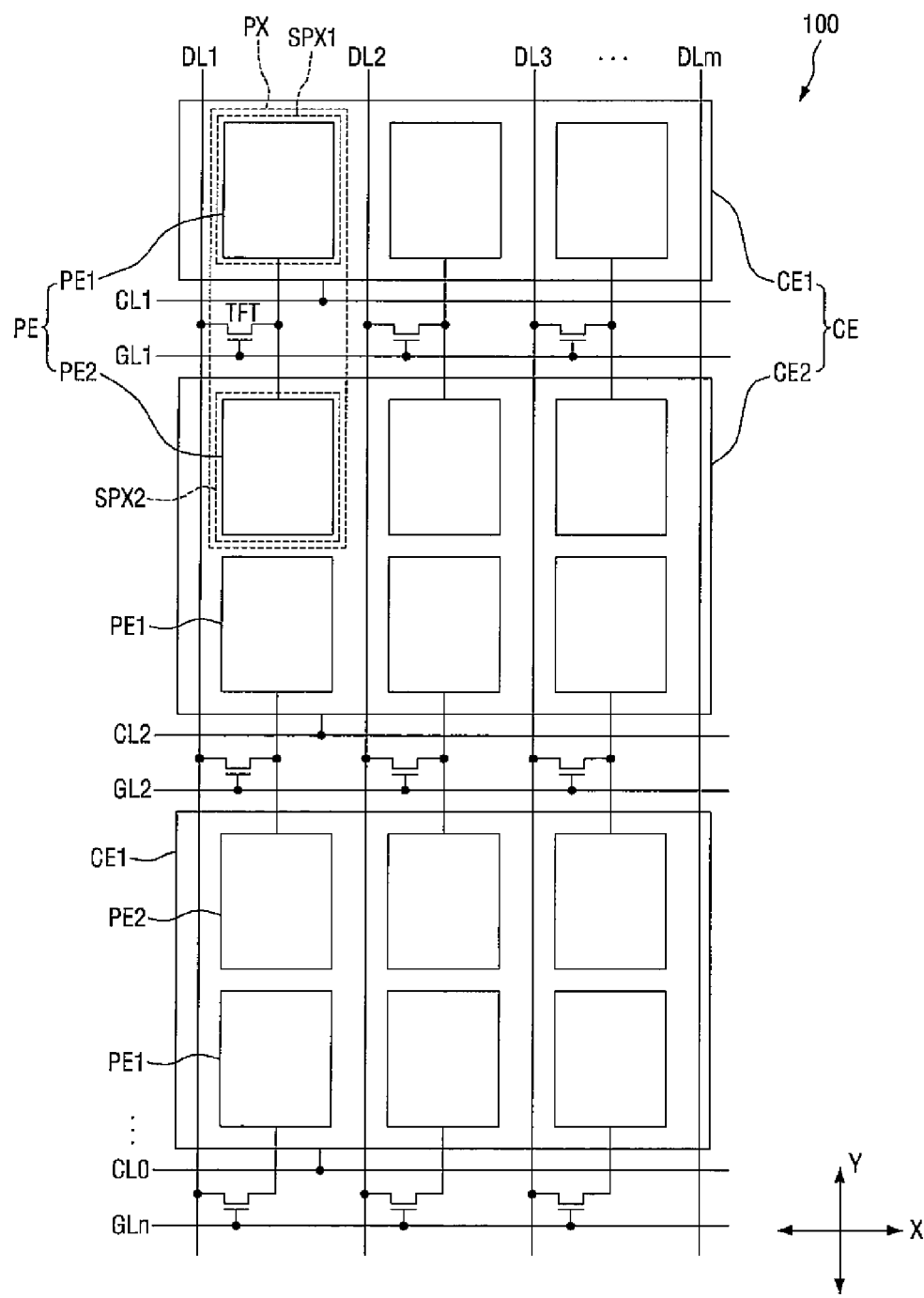
FIG. 1 is a schematic diagram of a liquid crystal display device according to one embodiment of the present invention.

Enhancements and features of the present invention and methods of accomplishing the same may be understood more readily by reference to the following detailed description of example embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the scope of the present invention will only be defined by the appended claims, and equivalents thereof.

It will also be understood that when a layer is referred to as being "on" another layer or substrate, it can be directly on the other layer or substrate, or intervening layers may also be present. The same reference numbers indicate the same components throughout the specification. Expressions such as "at least one of," when preceding a list of elements, modify the entire list of elements and do not modify the individual elements of the list. Further, the use of "may" when describing embodiments of the present invention refers to "one or more embodiments of the present invention."

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings.

Hereinafter, embodiments of the present invention will be described with reference to the accompanying drawings.

Figure 2:
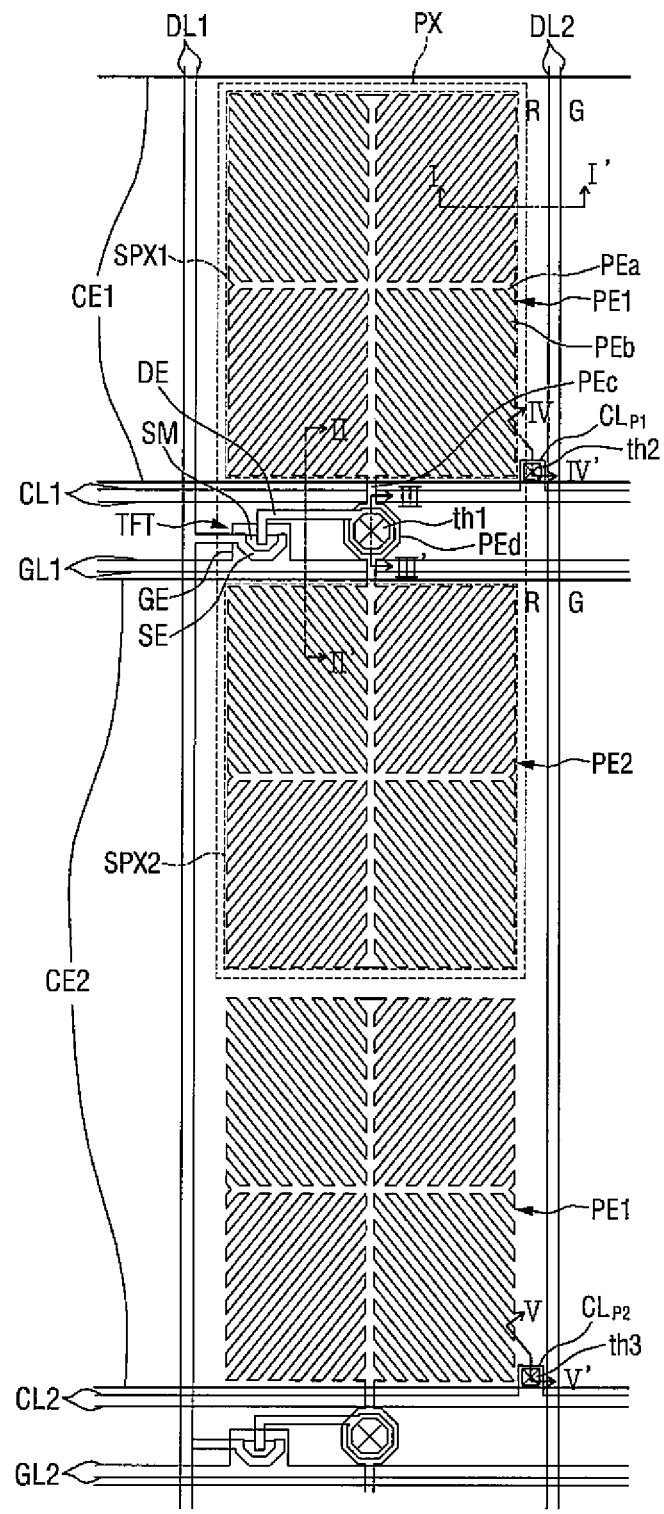
FIG. 2 shows a layout of one pixel of FIG. 1.
Figure 3:
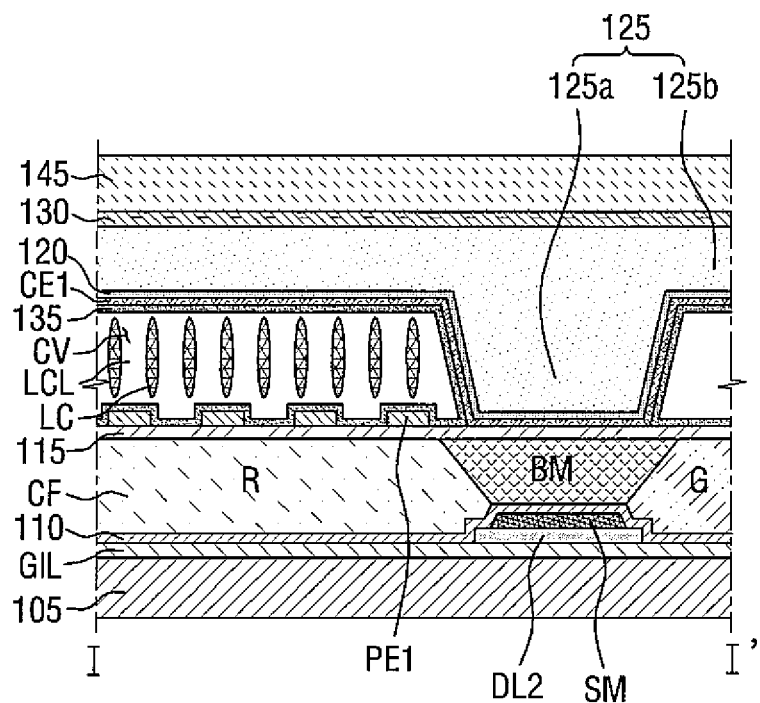
FIG. 3 is a cross-sectional view taken along the line I-I' of FIG. 2.
Figure 4:
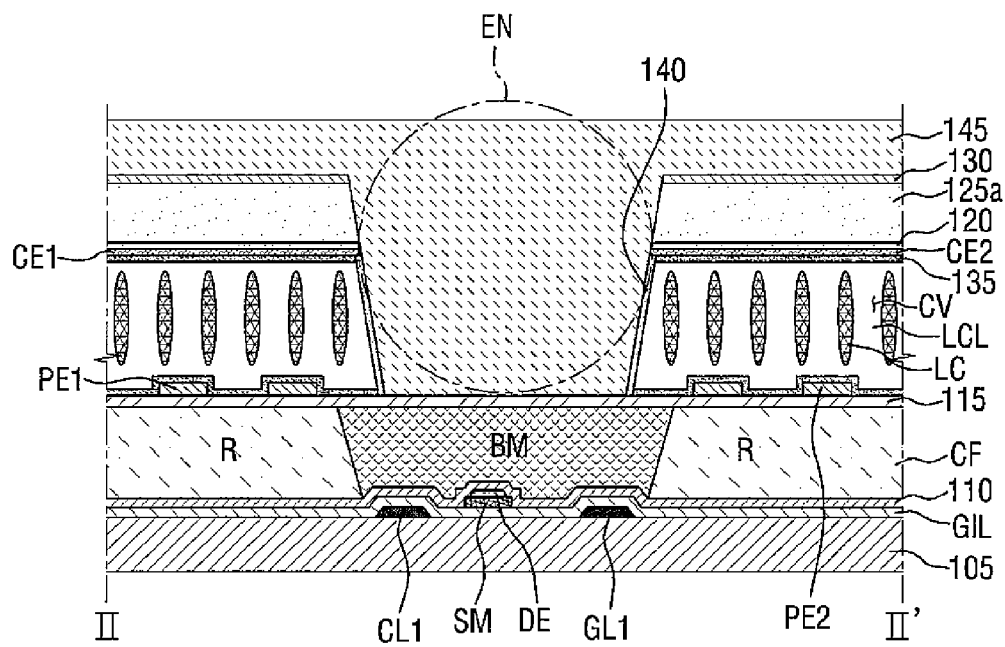
FIG. 4 is a cross-sectional view taken along the line II-II' of FIG. 2.
Figure 5:
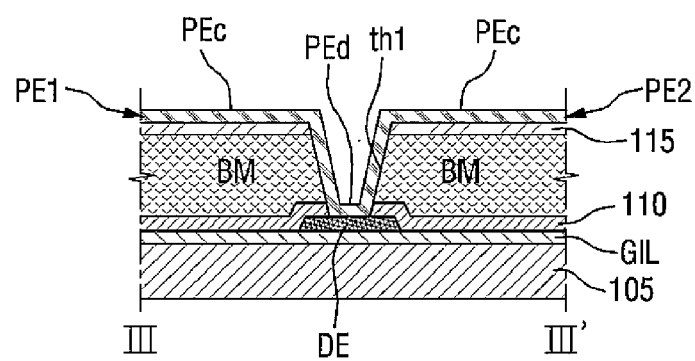
FIG. 5 is a cross-sectional view taken along the line III-III' of FIG. 2.
Figure 6:
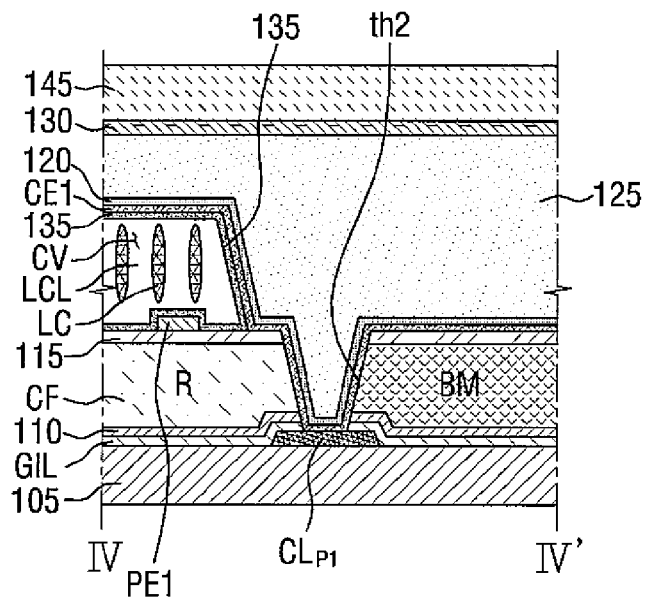
FIG. 6 is a cross-sectional view taken along the line IV-IV' of FIG. 2.
Figure 7:
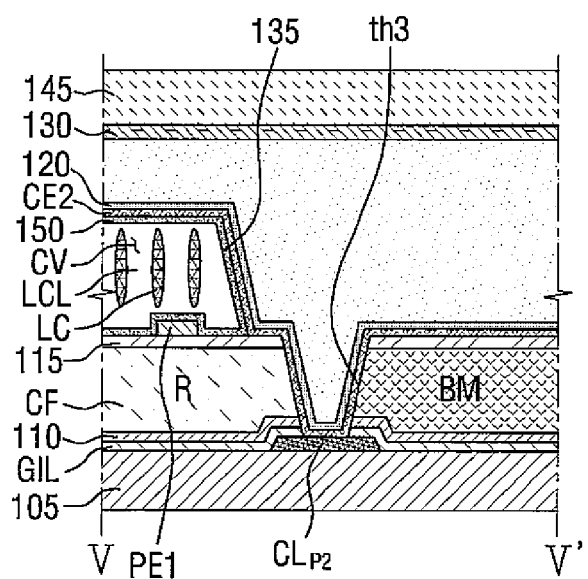
FIG. 7 is a cross-sectional view taken along the line V-V' of FIG. 2.

FIG. 1 is a schematic diagram of a liquid crystal display device according to one embodiment of the present invention, and FIG. 2 shows a layout of one pixel of FIG. 1. FIG. 3 is a cross-sectional view taken along the line I-I' of FIG. 2, and FIG. 4 is a cross-sectional view taken along the line II-II' of FIG. 2. FIG. 5 is a cross-sectional view taken along the line III-III' of FIG. 2, and FIG. 6 is a cross-sectional view taken along the line IV-IV' of FIG. 2. FIG. 7 is a cross-sectional view taken along the line V-V' of FIG. 2.

Referring to FIGS. 1 to 7, a liquid crystal display device 100 according to one embodiment of the present invention may include a substrate 105, gate lines GL1, GL2, . . . , GLn, data lines DL1, DL2, . . . , DLm, common lines CL1, CL2, . . . , CLo, a gate insulating layer GIL, thin film transistors TFT, an insulating layer 110, color filters CF, a black matrix BM, a first protective layer 115, pixel electrodes PE, common electrodes CE, a second protective layer 120, a covering layer 125, a third protective layer 130, an alignment film 135, a liquid crystal layer LCL, a sealing film 140 and a capping layer 145 (e.g., FIGS. 1 to 4).

The substrate 105 may be a transparent insulating substrate, and include a plurality of pixels PX, each pixel having a first sub-pixel SPX1 and a second sub-pixel SPX2.

The gate lines GL1, GL2, . . . , GLn are formed on the substrate 105 to extend in a first direction X and arranged to be spaced (spaced apart) from each other in a second direction Y intersecting (crossing) the first direction X. The gate lines GL1, GL2, . . . , GLn transmit a gate signal to the thin film transistors TFT. In this case, for example, the first sub-pixel SPX1 of one pixel PX may be located above the first gate line GL1 in the second direction Y, and the second sub-pixel SPX2 may be located below the first gate line GL1 in the second direction Y.

The data lines DL1, DL2, . . . , DLm may be formed on the substrate 105 to extend in the second direction Y, and arranged to be spaced from each other in the first direction X. The data lines DL1, DL2, . . . , DLm are insulated from the gate lines GL1, GL2, . . . , GLn to transmit a data signal to the thin film transistors TFT.

The common lines CL1, CL2, . . . , CLo are parallel to the gate lines GL1, GL2, . . . , GLn. Similarly to the gate lines GL1, GL2, . . . , GLn, the common lines CL1, CL2, . . . , CLo are formed to extend in the first direction X and arranged to be spaced from each other in the second direction Y. Among the common lines CL1, CL2, . . . , CLo, each of the odd-numbered common lines CL1, CL3, . . . may include a first protrusion CLp1 protruding in the second direction Y, and each of the even-numbered common lines CL2, CL4, . . . may include a second protrusion CLp2 protruding in the second direction Y (see FIGS. 2, 6 and 7). The common lines CL1, CL2, . . . , CLo apply a common voltage to the common electrodes CE.

The gate insulating layer GIL is formed of an insulating material to cover the gate lines GL1, GL2, . . . , GLn and the common lines CL1, CL2, . . . , CLo formed on the surface of the substrate 105. For example, the gate insulating layer GIL may include silicon nitride or silicon oxide. Also, the data lines DL1, DL2, . . . , DLm may be formed on the gate insulating layer GIL.

The thin film transistor TFT includes a gate electrode GE, a semiconductor layer SM, a source electrode SE and a drain electrode DE.

The gate electrode GE may be formed to protrude toward the semiconductor layer SM from each of the gate lines GL1, GL2, . . . , GLn on the plane (on the same layer). The gate electrode GE may include any one of indium tin oxide (ITO), indium zinc oxide (IZO) and indium tin zinc oxide (ITZO). Further, the gate electrode GE may have a two-layer structure including a first electrode layer made of the aforementioned material and a second electrode layer. The second electrode layer may be formed of a metal such as copper (Cu), molybdenum (Mo), aluminum (Al), tungsten (W), chromium (Cr), titanium (Ti), or an alloy including at least one of the metal materials.

The semiconductor layer SM is formed on the gate electrode GE while the gate insulating layer GIL is interposed therebetween. The semiconductor layer SM may include an active layer provided on the gate insulating layer GIL and an ohmic contact layer provided on the active layer.

Also, the semiconductor layer SM may be formed between the data lines DL1, DL2, . . . , DLm and the gate insulating layer GIL.

The source electrode SE is formed to protrude from each of the data lines DL1, DL2, . . . , DLm and overlap with at least a portion of the gate electrode GE on the plane (when projected to the plane). The drain electrode DE is formed to be spaced from the source electrode SE and overlap with at least a portion of the gate electrode GE on the plane. The source electrode SE and the drain electrode DE may be made of metal such as copper (Cu), molybdenum (Mo), aluminum (Al), tungsten (W), chromium (Cr), titanium (Ti), or an alloy including at least one of the metal materials. In this case, the source electrode SE and the drain electrode DE each overlap with a part of the semiconductor layer SM in a region other than a spaced (gap) region between the source electrode SE and the drain electrode DE.

The insulating layer 110 may be formed on the gate insulating layer GIL, and include, for example, silicon nitride or silicon oxide.

Each of the color filters CF is formed on the insulating layer 110 to correspond to each pixel PX, for example, the first sub-pixel SPX1 and the second sub-pixel SPX2. The color filter CF provides a color to the light transmitted through the liquid crystal layer LCL, and may be one of a red (R) filter, a green (G) filter and a blue (B) filter. However, the color filters CF are not limited to the above-mentioned color filters.

The black matrix BM is formed on the insulating layer 110 to correspond to the edge of each pixel PX, for example, the edge of the first sub-pixel SPX1 and the edge of the second sub-pixel SPX2 (see FIGS. 3 and 4). That is, the black matrix BM may be disposed so as to surround the color filters CF. The black matrix BM may overlap with the gate lines GL1, GL2, . . . , GLn, the data lines DL1, DL2, . . . , DLm, the common lines CL1, CL2, . . . , CLo and/or the thin film transistors TFT. The black matrix BM is formed of a light blocking material to block unnecessary light when implementing an image. For example, the black matrix BM may block light leakage caused by abnormal movement of liquid crystal molecules (materials) LC that may occur in the edge of the liquid crystal layer LCL, or color mixing that may occur in the edges of the color filters CF.

The first protective layer 115 may be formed on the color filters CF and the black matrix BM and serve to planarize the color filters CF and the black matrix BM. Further, the first protective layer 115 may protect the color filters CF and the black matrix BM. Accordingly, in a step of forming a cavity CV in which the liquid crystal molecules LC are injected, it is possible to reduce damage to the color filters CF and the black matrix BM due to an $O_2$ aching process for finally removing the remainder of a sacrificial layer in the cavity CV. The cavity CV may be formed by removing the sacrificial layer formed on the first protective layer 115 to correspond to each pixel PX, for example, the first sub-pixel SPX1 and the second sub-pixel SPX2, after the covering layer 125 and the third protective layer 130 are formed.

The first protective layer 115 may be formed of at least one of SiNx, SiOx and SiOxNy. Also, a first contact hole th1 may be formed to expose the drain electrode DE through the first protective layer 115 and the insulating layer 110. Further, a second contact hole th2 may be formed to expose the first protrusion CLp1 of the odd-numbered common lines CL1, CL3, . . . through the first protective layer 115, the insulating layer 110 and the gate insulating layer GIL. Further, a third contact hole th3 may be formed to expose the second protrusion CLp2 of the even-numbered common lines CL2, CL4, . . . through the first protective layer 115, the insulating layer 110 and the gate insulating layer GIL.

The pixel electrode PE includes a first pixel electrode PE1 formed in a region corresponding to the first sub-pixel SPX1 and a second pixel electrode PE2 formed in a region corresponding to the second sub-pixel SPX2 on the basis of each pixel PX on the substrate 105 (see FIG. 2). The first pixel electrode PE1 and the second pixel electrode PE2 are physically separated from each other, for example, by the first gate line GL1 and the first common line CL1. The first pixel electrode PE1 and the second pixel electrode PE2 are electrically connected to the drain electrode DE of the thin film transistor TFT (see FIG. 5), and the same pixel voltage is applied to the first pixel electrode PE1 and the second pixel electrode PE2. The first pixel electrode PE1 and the second pixel electrode PE2 may have an area ratio of 1:1.

Each of the first pixel electrode PE1 and the second pixel electrode PE2 includes, on the plane, at least one stem electrode PEa, a plurality of branch electrodes PEb extending from the stem electrode PEa, and an extending electrode PEc extending from the end of the stem electrode PEa toward the drain electrode DE (see FIGS. 2 and 5). The branch electrodes PEb may be formed to extend in parallel in a set or predetermined direction, and may be spaced from each other at regular intervals. Further, the pixel electrode PE may further include a connection electrode PEd electrically connecting the extending electrode PEc of the first pixel electrode PE1 to the extending electrode PEc of the second pixel electrode PE2. The connection electrode PEd may be electrically connected to the drain electrode DE through the first contact hole th1 formed in the first protective layer 115 and the insulating layer 110. The stem electrode PEa and the branch electrodes PEb may be arranged in various shapes without being limited to the shape shown in FIG. 2. The pixel electrode PE may be formed of a transparent conductive material, e.g., indium tin oxide (ITO) or indium zinc oxide (IZO).

In addition, the second pixel electrode PE2 of one pixel PX and the first pixel electrode PE1 of another pixel PX of the pixels PX adjacent to each other in the second direction Y of the substrate 105 are disposed, for example, between the first gate line GL1 and the second gate line GL2 to be physically separated from each other.

The common electrode CE is formed to be spaced from the pixel electrode PE on the substrate 105, for example, on the first protective layer 115. Accordingly, the cavity CV is formed between the common electrode CE and the pixel electrode PE. The liquid crystal molecules LC are injected into the cavity CV to form the liquid crystal layer LCL. The common electrode CE may be formed of a transparent conductive material, e.g., indium tin oxide (ITO) or indium zinc oxide (IZO). The common electrode CE and the pixel electrode PE generate an electric field to control an alignment direction of the liquid crystal molecules LC.

The common electrode CE includes, on the basis of each pixel PX, a first common electrode CE1 extending in the first direction X to overlap with the first pixel electrode PE1, and a second common electrode CE2 extending in the first direction X to overlap with the second pixel electrode PE2 (see FIG. 4). The first common electrode CE1 and the second common electrode CE2 are physically separated from each other while, for example, the first gate line GL1 and the first common line CL1 are interposed therebetween. The first common electrode CE1 and the second common electrode CE2 may be electrically connected to the first protrusion CLp1 of the first common line CL1 and the second protrusion CLp2 of the second common line CL2, respectively, through the second contact hole th2 and the third contact hole th3 formed in the first protective layer 115, the insulating layer 110 and the gate insulating layer GIL. Accordingly, different voltages are applied to the first common electrode CE1 and the second common electrode CE2, respectively, from the first common line CL1 and the second common line CL2. For example, a first common voltage applied to the first common electrode CE1 may be 7V, and a second common voltage applied to the second common electrode CE2 may be 8V.

Meanwhile, the second common electrode CE2 is formed as a single electrode (in one piece) on the second pixel electrode PE2 of one pixel PX and the first pixel electrode PE1 of another pixel PX of the pixels PX adjacent to each other in the second direction Y of the substrate 105. For example, the second common electrode CE2 is formed as a single electrode (in one piece) on the second pixel electrode PE2 and the first pixel electrode PE1 disposed between the first gate line GL1 and the second gate line GL2. In this case, the second common voltage of, e.g., 8V may be applied to the second common electrode CE2 on the second pixel electrode PE2 and the first pixel electrode PE1 disposed between the first gate line GL1 and the second gate line GL2. While an embodiment in which the second common electrode CE2 is formed as a single electrode on the second pixel electrode PE2 of one pixel PX and the first pixel electrode PE1 of another pixel PX of the pixels PX adjacent to each other in the second direction Y of the substrate 105 has been described above, the first common electrode CE1 may be formed as a single electrode.

The second protective layer 120 is formed on the common electrode CE to protect the common electrode CE. The second protective layer 120 may be formed of at least one of SiNx, SiOx and SiOxNy.

The covering layer 125 includes sidewalls 125a formed to separate a plurality of pixels PX from each other in the first direction X of the substrate 105, and a roof 125b formed above the sidewalls 125a to connect the sidewalls 125a (see FIGS. 3 and 4). The covering layer 125 may be formed of an organic material. The covering layer 125 may further include a liquid crystal inlet EN formed in the first direction X of the substrate 105 and located in a portion overlapping with the gate lines GL1, GL2, . . . , GLn. The liquid crystal molecules LC may be injected into the cavity CV through the liquid crystal inlet EN.

The third protective layer 130 is formed on the covering layer 125 to protect the covering layer 125. The third protective layer 130 may be formed of at least one of SiNx, SiOx and SiOxNy.

The alignment film 135 is formed on the pixel electrode PE and the common electrode CE in the cavity CV. The alignment film 135 may be formed of an alignment material such as polyamic acid, polysiloxane or polyimide.

The liquid crystal layer LCL is formed by injecting liquid crystal molecules into the cavity CV. The liquid crystal molecules may be aligned by the alignment film 135.

The sealing film 140 is formed to seal a liquid crystal inlet of the cavity CV in the liquid crystal inlet EN (see FIG. 4). The sealing film 140 may be formed of a sealing material which does not react with the liquid crystal molecules LC injected into the cavity CV.

The capping layer 145 is formed on the third protective layer 130, and may serve to planarize and protect the third protective layer 130 and the other configuration located below the third protective layer 130. The capping layer 145 may be formed of an insulating material.

Although not shown, the liquid crystal display device 100 may further include a sealing layer formed on the capping layer 145. By forming the sealing layer, it is possible to omit another substrate that is coupled to the substrate 105 on which the thin film transistors are formed in a comparable liquid crystal display device.

In the liquid crystal display device having the above-described structure, the thin film transistor TFT is turned on in response to the gate signal provided through the gate lines GL1, GL2, . . . , GLn. If the thin film transistor TFT is turned on, the data signal provided through the data lines DL1, DL2, . . . , DLm is provided to the pixel electrode PE through the thin film transistor TFT, and the common voltage provided through the common lines CL1, CL2, . . . , CLo is applied to the common electrode CE. Accordingly, an electric field is formed between the pixel electrode PE and the common electrode CE, and the liquid crystal of the liquid crystal layer LCL is driven according to the electric field, thereby displaying an image.

Next, the driving of the liquid crystal display device 100 will be described using (utilizing) one pixel PX.

Figure 8:
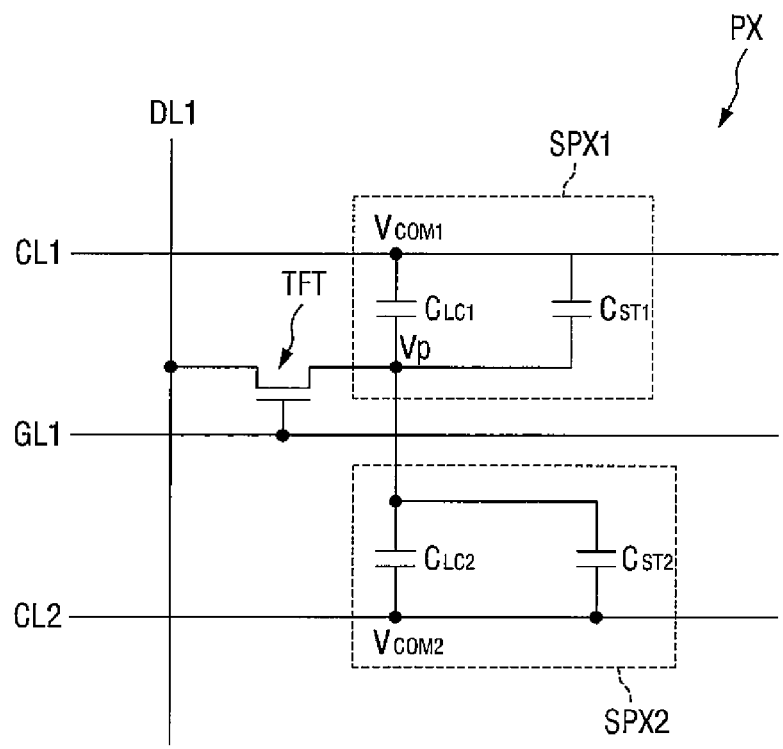
FIG. 8 is an equivalent circuit diagram of one pixel of FIG. 1.
Figure 9:
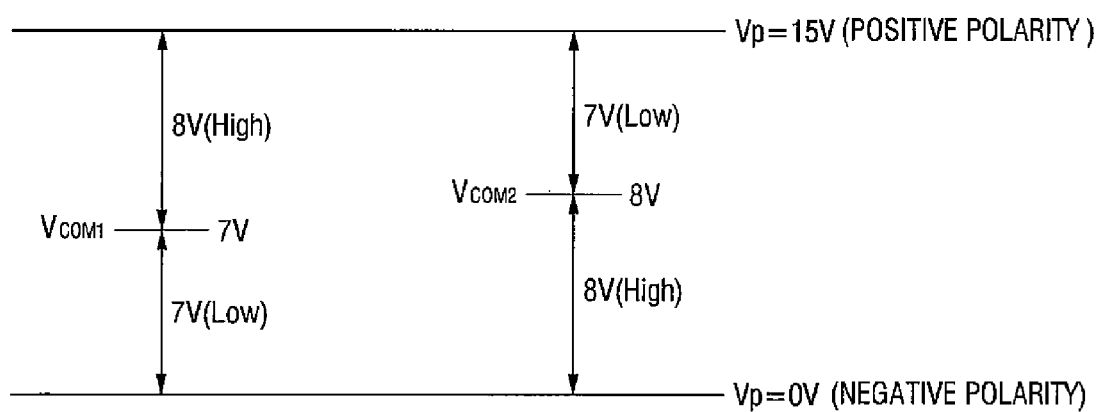
FIG. 9 is a diagram for explaining voltages applied to the sub-pixels of FIG. 1.
Figure 12:
FIG. 12 is a diagram showing an example of the first common voltage applied to the first common electrode of FIG. 1.
Figure 13:
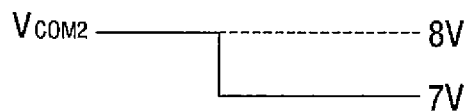
FIG. 13 is a diagram showing an example of the second common voltage applied to the second common electrode of FIG. 1.

FIG. 8 is an equivalent diagram of one pixel of FIG. 1. FIG. 9 is a diagram for explaining voltages applied to the sub-pixels of FIG. 1. FIG. 10 is a diagram showing the arrangement of voltages applied to the sub-pixels of FIG. 1. FIG. Ills a diagram showing the polarity of the pixel voltage applied to the sub-pixels and the arrangement of the common electrodes of FIG. 1. FIG. 12 is a diagram showing an example of the first common voltage applied to the first common electrode of FIG. 1. FIG. 13 is a diagram showing an example of the second common voltage applied to the second common electrode of FIG. 1.

Referring to FIG. 8, one pixel PX may include the thin film transistor TFT, a first liquid crystal capacitor $C_{LC1}$, a second liquid crystal capacitor $C_{LC2}$, a first storage capacitor $C_{ST1}$, a second storage capacitor $C_{ST2}$, the first pixel electrode PE1 (see FIG. 1), the second pixel electrode PE2 (see FIG. 1), the first common electrode CE1 (see FIG. 1), and the second common electrode CE2 (see FIG. 1).

The thin film transistor TFT is turned on if a gate-on signal is applied thereto through the first gate line GL1. In this case, a data voltage (or a pixel voltage $V_p$) supplied through the first data line DL1 is applied to the first pixel electrode PE1 (see FIG. 1) and the second pixel electrode PE2 (see FIG. 1) through the thin film transistor TFT. The pixel voltage $V_p$ may be, for example, 15V or 0V.

Then, a first common voltage $V_{com1}$ is applied to the first common electrode CE1 of FIG. 1 through the first common line CL1, and a second common voltage $V_{com2}$ different from the first common voltage $V_{com1}$ is applied to the second common electrode CE2 of FIG. 1 through the second common line CL2. The first common voltage $V_{com1}$ may be, for example, 7V, and the second common voltage $V_{com2}$ may be, for example, 8V.

Then, a first voltage corresponding to a difference between the first common voltage $V_{com1}$ and the pixel voltage $V_p$ applied to the first pixel electrode PE1 of FIG. 1 is applied to the liquid crystal (the first liquid crystal capacitor $C_{LC1}$ shown equivalently in FIG. 8), and a second voltage corresponding to a difference between the second common voltage $V_{com2}$ and the pixel voltage $V_p$ applied to the second pixel electrode PE2 of FIG. 1 is applied to the liquid crystal (the second liquid crystal capacitor $C_{LC2}$ shown equivalently in FIG. 8). Thus, light is transmitted at a transmittance corresponding to the intensity of a first electrical field corresponding to the first voltage and a second electrical field corresponding to the second voltage.

The first storage capacitor $C_{ST1}$ and the second storage capacitor $C_{ST2}$ may be used (utilized) as an auxiliary mechanisms to maintain the pixel voltage $V_p$ during one frame.

Referring to FIG. 9, for example, if the pixel voltage $V_p$ is 15V, the first common voltage $V_{com1}$ is 7V and the second common voltage $V_{com2}$ is 8V, the first voltage may be 8V and the second voltage may be 7V. Accordingly, in one pixel PX, 8V (i.e., voltage of high level H) may be applied to the first sub-pixel SPX1, and 7V (i.e., voltage of low level L smaller than the voltage of high level H) may be applied to the second sub-pixel SPX2.

FIG. 10 illustrates that the voltage of the high level H and the voltage of the low level L is applied to each of the pixels PX. For this voltage application, the pixel voltage $V_p$ has the polarity as shown in FIG. 11, and the first common electrodes CE1 to which the first common voltage $W_{com1}$ (e.g., 7V) is applied and the second common electrodes CE2 to which the second common voltage $V_{com2}$ (e.g., 8V) is applied are arranged as shown in FIG. 11. In FIGS. 10 and 11, R may refer to a red pixel emitting red light, G may refer to a green pixel emitting green light, and B may refer to a blue pixel emitting blue light. Further, "+" may refer to that the pixel voltage $V_p$ is a positive voltage, for example, 15V, relatively higher than the first common voltage $V_{com1}$ and the second common voltage $V_{com2}$, and "−" may refer to that the pixel voltage $V_p$ is a negative voltage, for example, 0V, relatively lower than the first common voltage $W_{com1}$ and the second common voltage $V_{com2}$.

As described above, by applying different voltages, i.e., the voltage of the high level H and the voltage of the low level L, to each pixel PX, the alignment direction of the liquid crystal molecules may vary in each pixel PX. Accordingly, the visibility of the liquid crystal display device 100 can be improved.

Meanwhile, if the same voltage is continuously applied to the liquid crystal, charges may be accumulated in the liquid crystal layer including the liquid crystal material. In this case, when the liquid crystal display device 100 is driven, a residual image may be formed on the substrate 105 on which the image is displayed. Thus, it is necessary to change the voltage applied to the liquid crystal material at an arbitrary time. To that end, referring to FIGS. 12 and 13, in one pixel PX, the first common voltage $V_{com1}$ may be applied to the first common electrode CE1 of the first sub-pixel SPX1 at a swing of 1V (e.g., swing or change from 7V to 8V), and the second common voltage $V_{com2}$ may be applied to the second common electrode CE2 of the second sub-pixel SPX2 at a swing of 1V (e.g., swing or change from 8V to 7V). In this case, the swing of the first common voltage $V_{com1}$ and the second common voltage $V_{com2}$ may be achieved at irregular timings, for example, in irregular units of frames, to minimize or reduce degradation of the quality of the image.

Next, the transmittance of the liquid crystal display device according to one embodiment of the present invention will be described.

Figure 14:
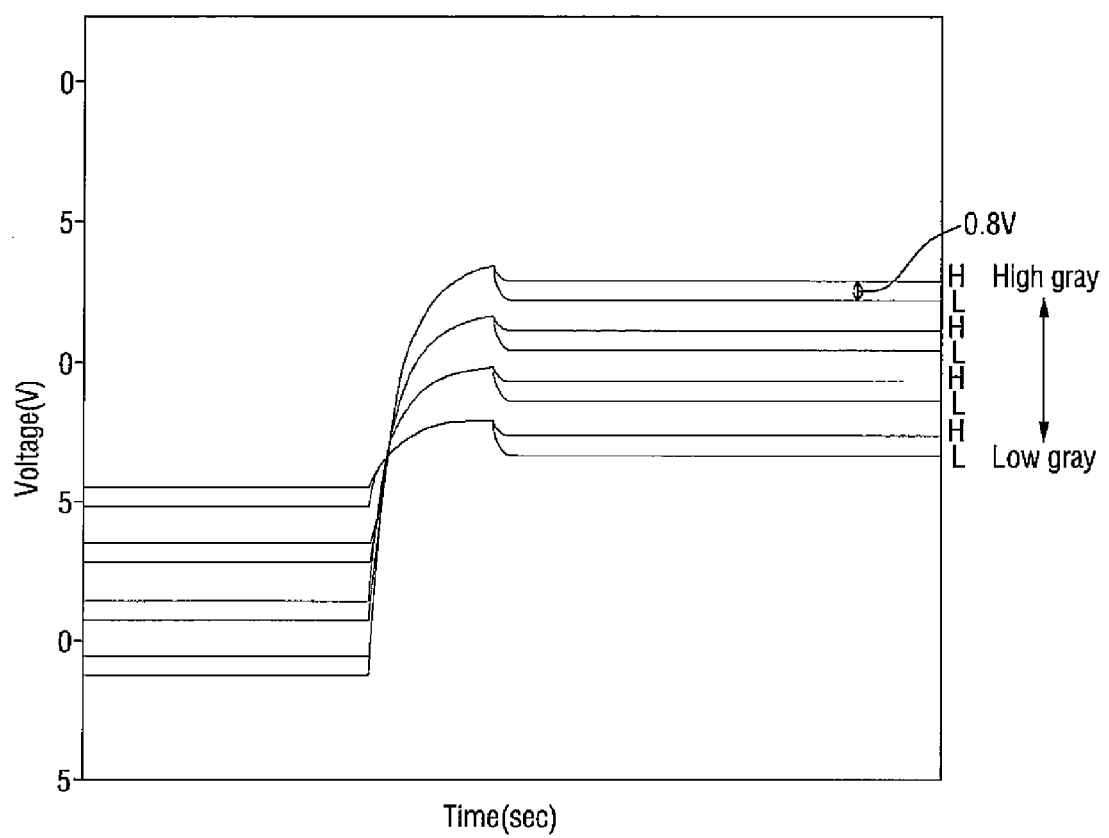
FIG. 14 is a graph showing a simulation of a voltage difference between the first sub-pixel and the second sub-pixel according to a gray scale in the liquid crystal display device of FIG. 1.

FIG. 14 is a graph showing a simulation of a voltage difference between the first sub-pixel and the second sub-pixel according to a gray scale in the liquid crystal display device of FIG. 1.

Referring to FIG. 14, in the liquid crystal display device 100 of FIG. 1, a difference between the first voltage (i.e., voltage of the H level) of the first sub-pixel and the second voltage (i.e., voltage of the L level) of the second sub-pixel has a constant value of about 1V or less at a high gray level and a low gray level. At a low gray level, even if a difference between the first voltage of the first sub-pixel and the second voltage of the second sub-pixel is large, the loss of transmittance is not large. However, at a high gray level, the loss of transmittance is small when a difference between the first voltage of the first sub-pixel and the second voltage of the second sub-pixel is small. That is, in the liquid crystal display device 100 according to one embodiment of the present invention, since a difference between the first voltage of the first sub-pixel and the second voltage of the second sub-pixel is about 1V or less at a high gray level, the loss of transmittance is only about 1V or less. Thus, the loss of transmittance may not be recognized with the naked eye at a high gray level.

As described above, in the liquid crystal display device 100 according to one embodiment of the present invention, by forming in one pixel PX the thin film transistor TFT, the first pixel electrode PE1 and the second pixel electrode PE2 (to which the same pixel voltage $V_p$ is applied), and the first common electrode CE1 and the second common electrode CE2 (to which different common voltages $V_{com1}$ and $V_{com2}$ are applied) on one substrate, it is possible to increase an aperture ratio while improving the visibility with a simple structure.

Further, in the liquid crystal display device 100 according to one embodiment of the present invention, by controlling a difference between the first voltage (applied to the first sub-pixel SPX1) and the second voltage (applied to the second sub-pixel SPX2) in one pixel PX to about 1V or less, the display quality can be improved by reducing or minimizing the loss of transmittance, for example, the loss of transmittance at a high gray level.

In concluding the detailed description, those skilled in the art will appreciate that many variations and modifications can be made to the example embodiments without substantially departing from the principles of the present invention. Therefore, the disclosed example embodiments of the invention are used in a generic and descriptive sense only and not for purposes of limitation. The scope of the present invention is only defined by the following claims, and equivalents thereof.

What is claimed is:

1. A liquid crystal display device, comprising:
   a substrate including a plurality of pixels, each of the pixels having a first sub-pixel and a second sub-pixel;
   a pixel electrode on the substrate and including a first pixel electrode in a region corresponding to the first sub-pixel and a second pixel electrode in a region corresponding to the second sub-pixel;
   a common electrode on the substrate, a cavity between the common electrode and the pixel electrode, the common electrode including a first common electrode spaced from the first pixel electrode and a second common electrode spaced from the second pixel electrode; and
   a thin film transistor between the first pixel electrode and the second pixel electrode on the substrate, wherein the first pixel electrode and the second pixel electrode are arranged at opposite sides of and electrically connected via a same first contact hole to a same drain electrode of the thin film transistor.

2. The liquid crystal display device of claim 1, wherein a same data voltage is applied to the first pixel electrode and the second pixel electrode,
   wherein a first common voltage is applied to the first common electrode, and
   wherein a second common voltage different from the first common voltage is applied to the second common electrode.

3. The liquid crystal display device of claim 2, wherein each of the first common voltage and the second common voltage has a swing of 1V in irregular units of frames.

4. The liquid crystal display device of claim 1, wherein the first pixel electrode and the second pixel electrode have an area ratio of 1:1.

5. The liquid crystal display device of claim 1, further comprising:
a plurality of gate lines on the substrate, extending in a first direction and spaced from each other in a second direction crossing the first direction;
a plurality of common lines on the substrate and in parallel to the gate lines; and
a plurality of data lines on the substrate, spaced from the gate lines, extending in the second direction, and spaced from each other in the first direction,
wherein among the plurality of common lines, odd-numbered common lines are electrically connected to the first common electrode, and even-numbered common lines are electrically connected to the second common electrode.

6. The liquid crystal display device of claim 5, wherein the first sub-pixel is above a first gate line of the plurality of gate lines in the second direction, and the second sub-pixel is below the first gate line in the second direction.

7. The liquid crystal display device of claim 6, wherein a second gate line of the plurality of gate lines is at a next stage of the first gate line, an other first sub-pixel is above the second gate line, and an other second sub-pixel is below the second gate line, and
wherein the first common electrode or the second common electrode is a single electrode on the second pixel electrode of the second sub-pixel below the first gate line and a first pixel electrode of the other first sub-pixel above the second gate line.

8. The liquid crystal display device of claim 6, wherein each of the first common electrode and the second common electrode has a structure to horizontally extend in the first direction.

9. The liquid crystal display device of claim 6, wherein the thin film transistor includes a gate electrode connected to each of the gate lines, a source electrode connected to each of the data lines, and the drain electrode connected to the first pixel electrode and the second pixel electrode, and
wherein the liquid crystal display device further comprises:
the first contact hole to electrically connect the first pixel electrode and the second pixel electrode to the drain electrode;
a second contact hole to electrically connect the first common electrode to the odd-numbered common lines;
a third contact hole to electrically connect the second common electrode to the even-numbered common lines; and
a liquid crystal layer between the first pixel electrode and the first common electrode, and between the second pixel electrode and the second common electrode.

10. A liquid crystal display device, comprising:
a substrate including a plurality of pixels, each of the pixels having a first sub-pixel and a second sub-pixel;
a plurality of gate lines on the substrate, extending in a first direction, and spaced from each other in a second direction crossing the first direction, and a plurality of common lines on the substrate in parallel to the gate lines;
a gate insulating layer on the substrate to cover the gate lines and the common lines;
a plurality of data lines on the substrate, extending in the second direction, and spaced from each other in the first direction;
an insulating layer on the gate insulating layer to cover the data lines;
a pixel electrode including a first pixel electrode in a region corresponding to the first sub-pixel and a second pixel electrode in a region corresponding to the second sub-pixel on the insulating layer;
a common electrode on the insulating layer and spaced from the pixel electrode, a cavity between the common electrode and the pixel electrode, the common electrode including a first common electrode extending in the first direction to overlap with the first pixel electrode and a second common electrode extending in the first direction to overlap with the second pixel electrode; and
a thin film transistor between the first pixel electrode and the second pixel electrode on the substrate, wherein the first pixel electrode and the second pixel electrode are arranged at opposite sides of and electrically connected via a same first contact hole to a same drain electrode of the thin film transistor.

11. The liquid crystal display device of claim 10, wherein a same data voltage is applied to the first pixel electrode and the second pixel electrode,
wherein a first common voltage is applied to the first common electrode, and
wherein a second common voltage different from the first common voltage is applied to the second common electrode.

12. The liquid crystal display device of claim 11, wherein each of the first common voltage and the second common voltage has a swing of 1V in irregular units of frames.

13. The liquid crystal display device of claim 10, wherein the first pixel electrode and the second pixel electrode have an area ratio of 1:1.

14. The liquid crystal display device of claim 10, wherein the first sub-pixel is above a first gate line of the plurality of gate lines in the second direction, and the second sub-pixel is below the first gate line in the second direction.

15. The liquid crystal display device of claim 14, wherein a second gate line of the plurality of gate lines is at a next stage of the first gate line, an other first sub-pixel is above the second gate line, and an other second sub-pixel is below the second gate line, and
wherein the first common electrode or the second common electrode is a single electrode on the second pixel electrode of the second sub-pixel below the first gate line and a first pixel electrode of the other first sub-pixel above the second gate line.

16. The liquid crystal display device of claim 10, further comprising:
a first protective layer between the insulating layer and the pixel electrode;
a second protective layer on the common electrode;
a covering layer on the first protective layer to include sidewalls to separate the plurality of pixels from each other in the first direction, and a roof above the sidewalls;
a liquid crystal layer including liquid crystal molecules in the cavity; and
a capping layer on the covering layer.

17. The liquid crystal display device of claim 16, wherein the covering layer includes a liquid crystal inlet in the first direction to overlap with the gate lines, and wherein the liquid crystal display device further comprises a sealing film to seal the liquid crystal inlet.

18. The liquid crystal display device of claim 17, wherein the thin film transistor includes a gate electrode connected to each of the gate lines, a source electrode connected to each of the data lines, and the drain electrode connected to the first pixel electrode and the second pixel electrode.

19. The liquid crystal display device of claim 18, further comprising:
   the first contact hole to expose the drain electrode through the first protective layer and the insulating layer;
   a second contact hole to expose a first protrusion on a first common line through the first protective layer, the insulating layer and the gate insulating layer; and
   a third contact hole to expose a second protrusion on a second common line through the first protective layer, the insulating layer and the gate insulating layer,
   wherein the first pixel electrode and the second pixel electrode are electrically connected to the drain electrode through the first contact hole, the first common electrode is electrically connected to the first common line through the second contact hole, and the second common electrode is electrically connected to the second common line through the third contact hole.

20. The liquid crystal display device of claim 19, wherein the first protrusion is between first sub-pixels in the first direction, and the second protrusion is between second sub-pixels in the first direction.

\* \* \* \* \*